May 10, 1966     C. C. PEASE     3,250,891

STUD WELDING DEVICE

Filed June 8, 1962

INVENTOR.
Charles C. Pease
BY
Morse & Altman
ATTORNEYS

United States Patent Office 3,250,891
Patented May 10, 1966

3,250,891
STUD WELDING DEVICE
Charles C. Pease, Pennsauken, N.J., assignor to KSM Products, Inc., Moorestown, N.J., a corporation of New Jersey
Filed June 8, 1962, Ser. No. 201,155
1 Claim. (Cl. 219—113)

The present invention relates to electric welding and, more particularly, to stud welding devices for joining one end of an axially elongated stud to the surface of a laterally extended workpiece for any of a variety of purposes. For example, the outer end of the stud may be threaded to permit desired components to be fastened to the workpiece after the stud has been welded thereto.

A variety of electrical systems have been proposed for stud welding devices of the foregoing type. In one such system, the stud initially is held in contact with the workpiece while a current is passed across the junction therebetween, next is withdrawn from the workpiece to strike a pilot arc, then is maintained at a distance from the workpiece while a welding arc is produced by a current directed across the ionized path established by the pilot arc, and finally is plunged against the workpiece in order to unite molten contiguous portions of the stud and the workpiece. In order to achieve reproducible results, it is necessary that the amount of heating at the contiguous portions of the stud and the workpiece by precisely predetermined at the moment the contiguous portions are united. The amount of heating may be determined by a timer for controlling the duration of the welding arc.

The primary object of the present invention is to provide in a stud welding system of the foregoing type a novel timer which includes electronic components that are particularly selected and interrelated to ensure continued accuracy and prolonged life. Specifically, the timer of the present invention includes, as components which perform both independent and cooperative functions described in detail below: a full wave rectifying bridge connected across the D.C. power source in order to ensure that output polarity is correct regardless of applied polarity; a zener diode for regulating the voltage applied to the timer; an adjustable transient resistor-capacitor network for building a charge to a predetermined value within a predetermined period in response to the voltage regulated by the zener diode; a unijunction transistor for generating a sharp control pulse when the charge has reached the predetermined value notwithstanding undesired variations in ambient temperature; and a gating rectifier responsive to the pulse from the unijunction transistor for cutting off the welding arc.

Other objects of the present invention will in part be obvious and will in part appear hereinafter.

The invention accordingly comprises the apparatus possessing the construction, combination of elements and arrangement of parts which are exemplified in the following detailed disclosure, the scope of which will be indicated in the appended claims.

For a fuller understanding of the nature and objects of the present invention, reference should be had to the following detailed description taken in connection with the accompanying drawings wherein.

Figure 1:
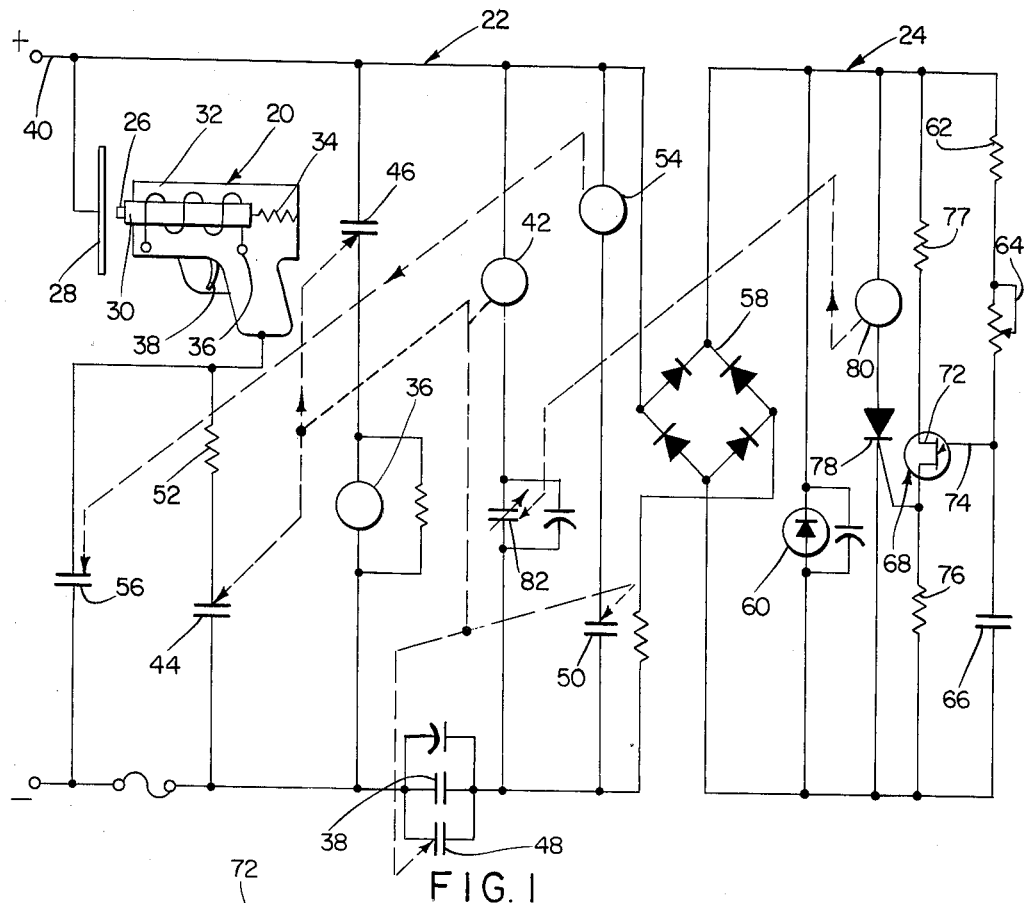
FIG. 1 is a schematic diagram of a stud welding system embodying the present invention.

Generally, the illustrated system includes a stud welding gun 20, a control circuit 22 and a timer circuit 24. Gun 20 will be described next in conjunction with a stud 26 and a workpiece 28. Control circuit 22 and timer circuit 24 then will be described in relation to the operation of gun 20 and the interrelation of their components.

As shown, gun 20 includes a chuck 30 for holding stud 26. Chuck 30 is reciprocable within the housing 32 of gun 20, being biased toward its most outward position by a spring 34 and being withdrawable to its most inward position by a solenoid 36. The chuck is so designed as to be forced into housing 32 when the gun is manually urged against workpiece 28. Under these circumstances, stud 26 bears against workpiece 28. In operation, when the trigger 38 of gun 20 is actuated, solenoid 36 withdraws stud 26 from workpiece 28 whereby a pilot arc is struck between the stud and workpiece. Next, control circuit 22 generates a welding arc and activates timer circuit 24. Then timer circuit 24 cuts off the welding arc and causes control circuit 22 to deenergize solenoid 36. Finally, the contiguous portions of stud 26 and workpiece 28 having been heated to molten state by the arc, spring 34 plunges stud 26 into contact with workpiece 28.

Control circuit 22 which is shown diagrammatically as comprising a direct current power supply 40, operates as follows. Trigger 38 of gun 20 constitutes a normally open switch. When trigger 38 is actuated, a control solenoid 42 is energized by power supply 40. Energization of relay 42 closes normally open switches 44, 46, 48 and 50. Switch 48 provides an interlock across trigger-operated switch 38 to maintain current through relay 42 when trigger 38 is released. The closing of switch 46 energizes gun solenoid 36 to withdraw stud 26 from workpiece 28 and the closing of switch 44 establishes a pilot arc through resistor 52 between stud 26 and workpiece 28. The closing of switch 50, which is timed to occur after the closing of switches 44, 46 and 48, establishes the welding arc by actuating relay 54, which closes switch 56.

Timer circuit 24 operates as follows. When trigger 38 is closed, voltage is applied across a full-wave rectifying bridge 58, which permits the timer circuit to operate irrespective of the polarity of the applied voltage. The applied voltage without regulation would vary greatly in magnitude between load and no-load conditions. Accordingly, connected across the applied voltage is a zener diode 60 which maintains a constant voltage with respect to the load notwithstanding any fluctuation in the voltage applied by the source. The zener diode acts as a short circuit at all voltages in excess of its avalanche voltage. In other words, zener diode 60 serves to clamp the voltage at a predetermined value below the load voltage. This voltage is applied to a resistor-capacitor network including a fixed resistor 62, a variable resistor 64 and a capacitor 66, which charges at a transient rate that is controlled by the setting of variable resistor 64. Resistor 62 serves to prevent the impedance from being reduced to zero. A unijunction transistor 68 having two base terminals 70 and 72 and an emitter 74 is designed to generate a sharp pulse when capacitor 66 develops a voltage of approximately 50% the voltage between base terminal 70 and base terminal 72. When this voltage is reached, unijunction transistor 68 fires, at which time heavy conduction occurs between emitter 74 and base terminal 70, producing a voltage pulse across a resistor 76. The relative currents through the terminals of unijunction transistor 68 vary with temperature. Accordingly, the voltage drop across resistor 77, which is in series with base terminal 72, varies with temperature so that the moment at which unijunction 68 fires is a function of ambient temperature. The terminal of resistor 76 that is connected to first base 70 of unijunction transistor 68 is connected also to the gate of a silicon controlled rectifier 78. Accordingly, the voltage developed across resistor 76 fires silicon controlled rectifier 78, energizing a relay 80. Energizing of relay 80 opens a normally closed switch 82 in control circuit, stopping the welding cycle. If trigger 38 is held closed after the welding cycle, silicon controlled rectifier 78 will continue to conduct, holding relay 80 energized and normally closed switch 82 opened, thus preventing an undesired repeat welding cycle.

Figure 2:
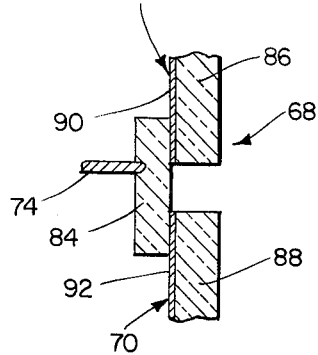
FIG. 2 is an exaggerated cross-sectional view of a unijunction transistor useful in the system of FIG. 1.

As shown in FIG. 2, unijunction transistor 68 includes an N type silicon bar 84. At one face of silicon bar 84, ceramic ohmic base contacts 86 and 88 are connected by discrete gold strata 90 and 92. Single P type emitter 74 composed for example of aluminum, is fused to the other face of bar 84 at a junction that is located closer to one base than to the other so that the device is not symmetrical. In normal operation of the unijunction transistor of FIG. 2, base 72 is grounded through resistor 76 (or a single pulse transformer winding) and a positive bias is applied across base 72 and base 70 as shown in FIG. 1. This bias is applied across base 72 and base 70 as shown in FIG. 1. This bias establishes a current and an electric field within silicon bar 84 and produces a voltage on the N side of the emitter junction. This voltage is a function $n$ of the applied interbase voltage $V_{BB}$. The function $n$ is termed the intrinsic standoff ratio. If the applied emitter voltage $V_E$ is less than $nV_{BB}$ the emitter junction will be reversely biased and only a small leakage current will flow in the emitter circuit. If $V_E$ exceeds $nV_{BB}$ by an amount equal to the forward voltage drop of the emitter diode, the emitter current will increase. Essentially, the path between emitter 74 and base 70 becomes highly conductive as compared to its prior state. If the source of emitter voltage $V_E$ is a capacitor, this capacitor will discharge through this conductive path to produce a pulse across resistor 76.

Figure 3:
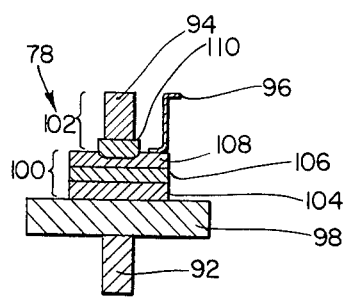
FIG. 3 is an exaggerated cross-sectional view of a gating rectifier useful in the system of FIG. 1.

Generally, as shown in FIG. 3, silicon controlled rectifier 78 is similar to an ordinary rectifier which conducts only in the forward direction from an anode 92 to a cathode 94. However, in silicon controlled rectifier 78, a block occurs in the forward direction also until a small voltage, known as the firing voltage, is applied to gate 96. Thereafter, conduction continues, even though the gate current is stopped, until the anode to cathode current is decreased below a given minimum, known as the holding current. Between anode 92 and cathode 94, in sequence, are a support 98, a PNP assemblage 100 and a PN assemblage 102. PNP assemblage 100 consists of silicon strata 104, 106 and 108. PN assemblage 102 consists of silicon stratum 108 and gold-antimony stratum 110. Gate lead 96 is connected to stratum 108. In essence, gating rectifier 78 is a PNPN unit with a gate lead connected to the inner P stratum. In operation, the voltage between the gate and the cathode must be above a predetermined minimum before conduction will occur. After conduction occurs, the current will continue even if the gate voltage is removed until the current decreases below a predetermined minimum at which time the silicon controlled rectifier returns to the forward blocking state with the gate open.

Although either silicon controlled rectifier 78 or unijunction transistor 68 may be used by itself without the other to control the duration of the welding current in response to the operation of resistor, capacitor network 62, 64, 66, the two in combination produce unusually reliable and reproducible results. Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

A timer for controlling the passage of direct current between a pair of terminals from an electrical source connected thereacross through a control switch, said electrical source being of sufficient power to generate welding heat between a stud and a workpiece plunged into contact with each other, said timer comprising an initiating switch and an initiating solenoid, said initiating solenoid being energized in response to said initiating switch, first switching means and second switching means actuated by said initiating solenoid such that actuation of said second switching means occurs following actuation of said first switching means, said first switching means constituting means for controlling the relative positions of said stud and said workpiece so plunged into contact with each other and said second switching means constituting means for controlling the passage of a direct current arc from said pair of terminals between said stud and said workpiece, said direct current arc being supplied from said pair of terminals through a control switch, a full wave rectifying bridge including four arms connected in a loop at four junctions, a first pair of said arms having a first pair of rectifying diodes of like direction, a second pair of said arms having a second pair of rectifying diodes of like direction, said first pair of diodes and said second pair of diodes being in parallel, said pair of terminals from said electrical source being connected across the junction between the rectifying diodes of said first pair and the rectifying diodes of said second pair, a timing network including a resistor and a capacitor in series, said timing network having a junction between said resistor and said capacitor and a pair of terminals on opposite extremities of said resistor and said capacitor, one of said opposite extremities being connected to one of the junctions between said first pair of rectifying diodes and said second pair of rectifying diodes, the other of said opposite extremities being connected to the other of the junctions between said first pair of rectifying diodes and said second pair of rectifying diodes, a unijunction transistor including a unijunction transistor emitter and a pair of unijunction transistor contacts, said unijunction transistor emitter being connected to said junction between said resistor and said capacitor of said timing network, said pair of unijunction transistor contacts being connected across said extremities of said resistor and said capacitor of said timing network, a silicon controlled rectifier having a pair of silicon controlled rectifier opposed contacts and a silicon controlled rectifier control contact, said pair of silicon controlled rectifier opposed contacts being connected across said extremities of said resistor and said capacitor of said timing network, said silicon controlled rectifier control contact being connected to one said pair of unijunction transistor contacts, a voltage limiting diode connected across the said pair of extremities of said capacitor and said resistor of said timing circuit, an intermediary solenoid in series with one of said pair of silicon controlled rectifier opposed contacts, said control switch being deactuated when said intermediary solenoid is energized.

References Cited by the Examiner

UNITED STATES PATENTS

| | | | |
|---|---|---|---|
| 2,461,060 | 2/1949 | Johnston et al. | 317—50 |
| 2,473,871 | 6/1949 | Edels | 219—98 |
| 2,648,748 | 8/1953 | Sayer | 219—98 |
| 2,796,513 | 6/1957 | Kelemen et al. | 219—98 |
| 3,045,150 | 7/1962 | Mann | 317—148.5 |
| 3,049,628 | 8/1962 | Higginbotham | 307—88.5 |
| 3,082,331 | 3/1963 | Peaslee | 307—88.5 |

OTHER REFERENCES

"Radio and Television News," July 1949, p. 82.

Publication (B), "Silicon Controlled Rectifier Manual," second edition, copyright 1961 by the General Electric Company, pp. 106, 107 and 108.

RICHARD M. WOOD, *Primary Examiner.*

SAMUEL BERNSTEIN, *Examiner.*

L. T. HIX, R. F. STAUBLY, *Assistant Examiners.*